H. R. Lavey.

Mower.

No 3389. Reissued Apr. 20, 1869

Witnesses.

Geo. B. Nichols

Inventor.

Hiram R. Lavey by Coburn & Mans attorneys

UNITED STATES PATENT OFFICE.

CHARLES R. COOK, OF BUFFALO, N. Y., ASSIGNEE OF HIRAM R. LAVEY.

IMPROVEMENT IN HARVESTERS.

Specification forming part of Letters Patent No. 54,374, dated May 1, 1866; Reissue No. 3,389, dated April 20, 1869.

*To all whom it may concern:*

Be it known that HIRAM R. LAVEY, of Bristol, in the county of Kenosha and State of Wisconsin, invented a new and useful Improvement in Reaping and Mowing Machines, of which the following is a full, clear, and exact description, reference being had to the accompanying drawings, and to the letters and figures marked thereon, which form part of this specification, and in which—

Figure 1:
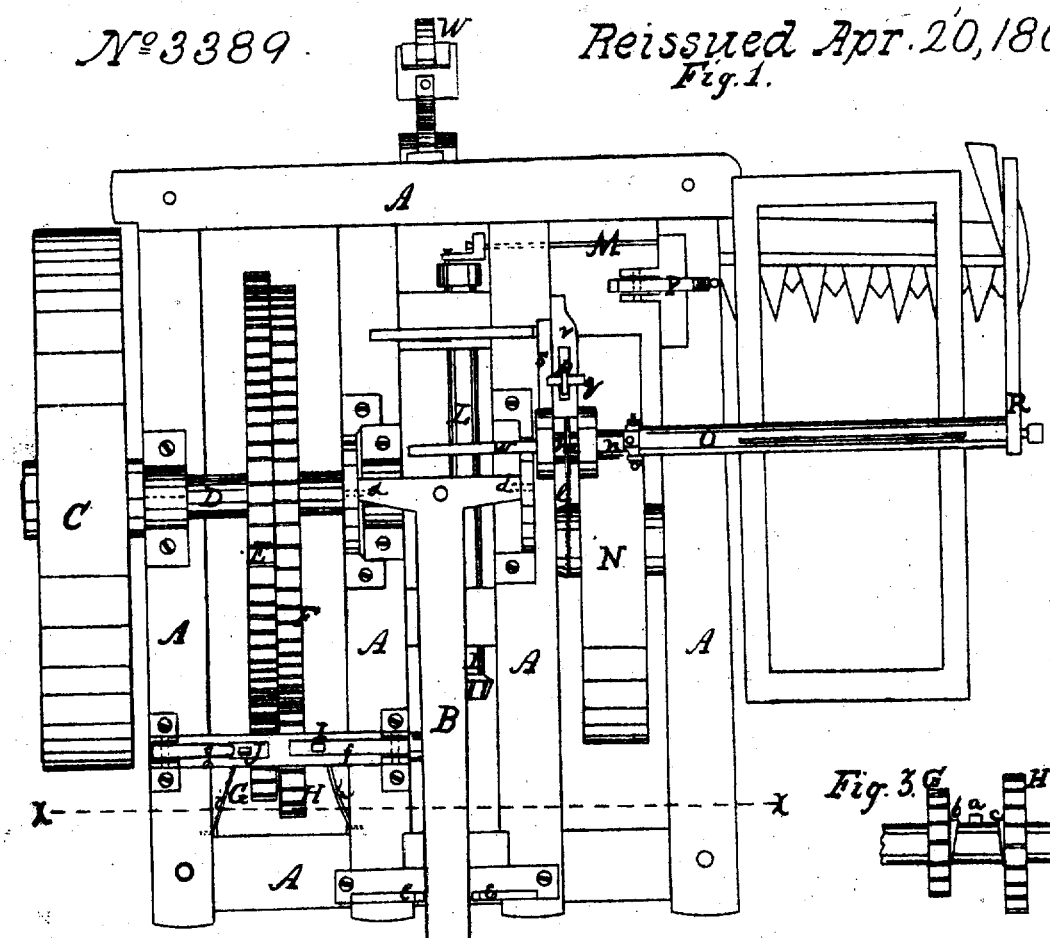
Figure 3:
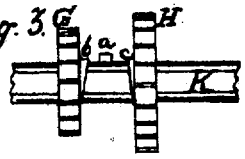
Figure 4:
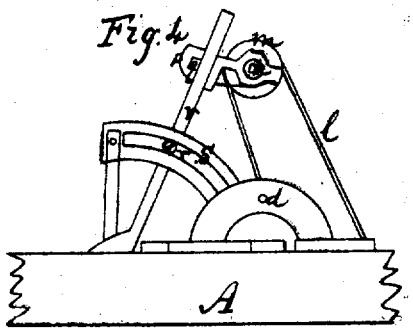
Figure 2:
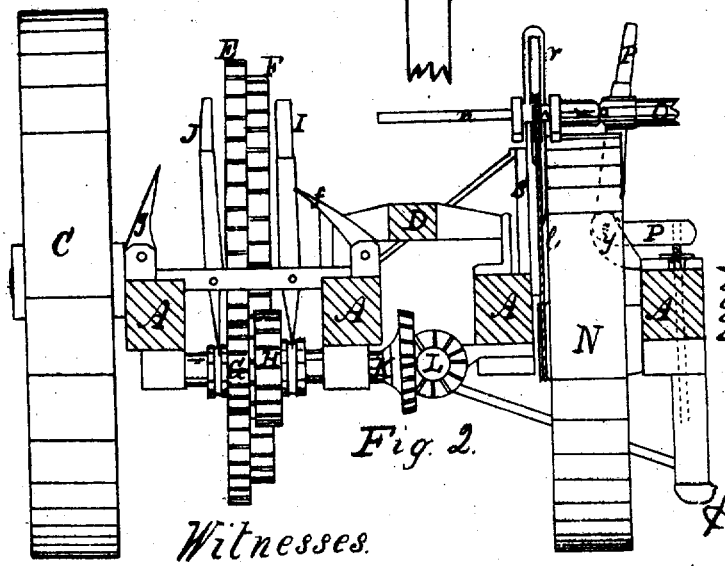

Figure 1 represents a plan or top view of the invention; Fig. 2, a front end view of the same in section at the line *x x* in Fig. 1. Fig. 3 is a detached view of the spur-wheels G and H with their attachments; and Fig. 4 shows a side view of the arrangement for adjusting the reel.

The invention consists in a novel arrangement of gearing, whereby the desired variations on the speed of vibration of the sickle are readily and easily secured for adapting the same to the different conditions or kind of crop operated upon.

Similar letters of reference denote corresponding parts in all the figures.

In the accompanying drawings, A represents the frame of the machine, and B the draft-pole or tongue thereof, which is pivoted at its rear end, as shown, by the pivot-bolts *d d*, and has a vertical motion about the same, being held in position by the vertical guides *e e* upon the front of the frame.

C represents the drive-wheel which, by means of the intermediate gearing, operates the sickle, N representing the other wheel of the machine, which propels the reel.

D represents the shaft of the driving-wheel C, supported in suitable bearings upon the frame, upon which shaft are fixed rigidly the gear-wheels E and F, one being larger than the other, in the proportions and for the purposes hereinafter specified. The spur-wheels G and H, which gear into the wheels E and F aforesaid, respectively, are arranged upon the shaft K loosely, so as to rotate independent of said shaft, except as hereinafter mentioned.

By means of the bevel-gearing upon the end of the shafts, as shown, the revolution of the shaft K revolves the shaft L, which drives the pitman-rod M, connected with the sickle, and thus operates the same.

*a*, Fig. 3, represents a stop or projection upon the shaft K, and *b c* respectively represent shoulders or clutches upon the sides of the wheels G and H. By this arrangement, when either of said spur-wheels G H is adjusted laterally upon the shaft K, so that the projections or clutch-faces *c* or *b* strike upon the stop or pin *a*, the revolution of said spur-wheel will revolve the shaft K, but when moved back the spur-wheel will revolve without imparting motion to the said shaft. Thus when the wheel G, which is driven by the wheel E, is thrown upon the stop or clutch pin *a* the shaft K is revolved more rapidly than when H, driven by F, is thrown upon said stop *a*. The lateral adjustment of the spur-wheels G H upon the shaft K is effected by means of the levers I J, both wheels being thrown off from said stop *a* and retained in such position when the braces *f g* are fixed against them, and being thrown upon said stop by the action of the springs *h i* when the braces *f g* are released. When the shaft K is being propelled by the wheel G it is not necessary that H should be thrown off from the stop *a*, as the more rapid revolution of G causes the shoulder *c* to recede from the said stop *a* in a retrograde motion, but when the shaft K is being driven by H care must be taken to throw the wheel G clear from said stop *a*. Thus by a proper adjustment of the gearing E G and F H, respectively, with respect to the size of the wheels and their position on shaft K, the different velocities required under the circumstances above mentioned may be given to the sickle.

*l* represents a belt or cord passing around the shaft or axle of the wheel N, and also around the drum *m*, through a square hole in which the square rod *n* passes and slides said rod *n*, being connected by a universal joint to the reel-shaft O.

*r* represents a slotted arm, pivoted at its lower end to the frame A, so as to have a vertical movement about said pivot, and held firmly in place, when adjusted, by means of a screw, *r'*, which slides in the slotted arc S. Through the slot in *r* the arm *p* passes, which supports the shaft *n* and reel, said arm being held in the desired position by the key *q*, as shown. By this arrangement the reel can be raised or lowered or moved forward or backward to any desired position and the band *l* always kept at the proper tension, the support R of the opposite end of the reel being provided with a series of holes, wherein the reel may be adjusted as desired.

P represents a bent lever, having its fulcrum at *y*, by means of which, in connection with the rod *k*, the front edge of the sickle-bar may be raised up, when desired, to adapt the same to the uneven surface of the ground.

W represents a wheel, which supports the rear part of the machine, which wheel is adjustable, so as to raise or lower the said rear part of the machine.

What is claimed as the invention of HIRAM R. LAVEY is—

1. The combination of two spur driving-gears of unequal size with two corresponding pinions, for changing the speed of the cutters.

2. So combining two driving-gears of unequal size and two pinions meshing therewith that the speed of vibration of the cutters may be changed without throwing said gears out of mesh.

3. Two gear-wheels or pinions on one shaft, either of which may be clutched to or unclutched from said shaft, for changing the speed of vibration of the cutters, substantially as described.

CHS. R. COOK.

Witnesses:
E. G. CALVIN,
S. R. ROGERS.